United States Patent [19]

Kanamori et al.

[11] Patent Number: 4,929,978
[45] Date of Patent: May 29, 1990

[54] COLOR CORRECTION METHOD FOR COLOR COPIER UTILIZING CORRECTION TABLE DERIVED FROM PRINTED COLOR SAMPLES

[75] Inventors: Katsuhiro Kanamori, Kawasaki; Yoshimitsu Kanno, Sagamihara; Toshiharu Kurosawa, Yokohama; Hidehiko Kawakami, Tokyo; Motohiko Naka; Hiroaki Kotera, both of Kawasaki, all of Japan

[73] Assignee: Matsushita Electric Industrial Co., Ltd., Osaka, Japan

[21] Appl. No.: 261,254

[22] Filed: Oct. 24, 1988

[30] Foreign Application Priority Data

Oct. 23, 1987 [JP] Japan .................. 62-268575
Nov. 4, 1987 [JP] Japan .................. 62-278623
Jul. 13, 1988 [JP] Japan .................. 63-174559

[51] Int. Cl.$^5$ ........................................... G03B 27/80
[52] U.S. Cl. .................................. 355/38; 355/77; 358/80
[58] Field of Search .................. 355/38, 68, 77, 326, 355/327; 358/75, 80, 283, 298

[56] References Cited

U.S. PATENT DOCUMENTS 4,058,828 11/1977 Ladd ........................... 358/80
4,402,007 8/1983 Yamada ........................ 358/80
4,745,466 5/1988 Yoshida et al. ................ 358/80

FOREIGN PATENT DOCUMENTS 61257071 11/1986 Japan .
621368 1/1987 Japan .

OTHER PUBLICATIONS

"The Specification of Colour Appearance. I. Concepts and Terms", by R. W. G. Hunt, Color Research and Application, vol. 2, No. 2, (1977), pp. 55–68.

Primary Examiner—L. T. Hix
Assistant Examiner—D. Rutledge
Attorney, Agent, or Firm—Lowe, Price, LeBlanc, Becker & Shur

[57] ABSTRACT

A color correction method applicable to a digital processing type of color copier, whereby a set of color patches of respectively different sample colors is printed using a set of printing data values, the color patches are then scanned and analyzed to obtain color patch input data values by the color copier, and each of all of the possible input color data values that can be produced by the scanner/analyzer section of the color copier is then related to one of the color patch input data values which is closest thereto in a 3-dimensional color space. Each of these possible input color data values is thereby related to an appropriate color printing value, whereby a color correction table can be generated which provides correction accuracy that is independent of non-linearity of color printing characteristics.

6 Claims, 11 Drawing Sheets

X SPACE
(C, M, Y, PRINTING DATA VALUES)

D SPACE
($D_R, D_G, D_B$, COLOR DENSITY VALUES)

COLOR CORRECTION METHOD FOR COLOR COPIER UTILIZING CORRECTION TABLE DERIVED FROM PRINTED COLOR SAMPLES

BACKGROUND OF THE INVENTION

1. Field of the Invention

The present invention relates to a method of color correction which is especially applicable to a digital operation color copier. The method is based upon establishing a table which relates all of the possible input color data values that may be obtained by scanning an original image, to corresponding output signal values to be utilized in driving a printer section for printing colors respectively corresponding closely to colors of the original image.

2. Description of Prior Art

In recent years, color copiers have been developed which utilize light beam scanning of a photo-sensitive drum to form successive color images which are successively transferred to an output sheet in correct registration for producing a color image. Drive signals for this light beam scanning, referred to in the following as printer drive signals, are produced based on sequentially scanning successive portions of an original color image, separating the level of reflected light from the image into three color components (i.e. red, green, blue), converting the respective intensities of these components into respective color density values, and determining the printer drive signals in accordance with these color density values. In such a color copier apparatus, the color separation is executed by dichroic filters, and the respective levels of red, green and blue light which are detected as electrical signals during scanning of the original image are converted into successive input digital values. All subsequent operations, up to the stage of modulating the aforementioned light beams used for print-out scanning, are executed by digital processing.

The basic requirement for such a color copier apparatus is that the color of each portion of a print-out image produced from the apparatus should approach as closely as possible the color of a corresponding portion of the original image. It is possible to achieve a high degree of accuracy of color separation of the reflected light obtained by scanning the original image. However as is well known, any ink or other colorant utilized in color printing cannot provide a spectrally pure color, but is actually a mixture of colors. It is therefore necessary to execute a type of compensation for this effect, referred to as color "masking" correction, as described in detail hereinafter. In general in the prior art, this correction processing has been executed using values obtained from computations using predetermined equations in which the aforementioned input digital values are inserted as variables. However satisfactory compensation over a wide range of possible input color values cannot be achieved by such a prior art method, due to variations introduced by the characteristics of different scanner systems and printing systems, e.g. resulting from manufacturing variations. In addition, such color correction based on predetermined computations using masking equations has the disadvantage of a lack of flexibility, so that it is not possible for example to provide optimum correction within a desired specific range of color variation or range of image lightness (gray scale) variation. In addition, with such a prior art method of color masking correction, it is not possible to readily introduce desired degrees of color enhancement, i.e. to implement increased degrees of saturation of certain colors which are greater than those of the original image, or to increase the overall lightness of the output color image while maintaining chromatic values which will appear identical to those of the original image. This may be desirable, for example, to provide a more visually pleasing effect in the printed color image.

SUMMARY OF THE INVENTION

It is an objective of the present invention to overcome the disadvantages of the prior art as set out above, by providing a color correction method applicable to a color copier apparatus whereby correction can be executed to a high degree of accuracy that is independent of variable factors such as manufacturing variations in the characteristics of a printing system of the color copier apparatus, amount of non-linearity of the printing systems characteristics, etc.

It is a further objective of the invention to provide a color correction method whereby a relative increase in color correction accuracy can be achieved within specific ranges of chromatic or achromatic colors.

It is moreover an objective of the invention to provide a color correction method whereby the overall lightness of a printed output image produced by a color copier apparatus can be varied relative to that of an original color image by a specific amount.

It is also an objective of the invention to provide a color correction method whereby each of the lightness, chroma and hue color attributes of all regions of a printed output image can be mutually independently adjusted by respective fixed amounts relative to the corresponding color attributes of an original color image.

To achieve the above objectives, with one embodiment of the method of the present invention applied to a color copier apparatus including color scanning means for scanning an original color image to obtain successive input color values each expressed in a tri-color color space, a color correction table memory responsive to respective ones of the input color values for producing corrected data comprising corresponding output color values, and color printing means responsive to the output color values for reproducing the original color image as an output color image, the method is characterized in that the color correction table memory is produced by steps of:

computing a set of color patch printing color values for use in printing respective ones of a set of color patches of respectively different sample colors;

supplying the color patch printing color values to the color printing means for producing a printed set of color patches;

scanning the printed set of color patches by the color scanning means to to obtain a set of color patch input data values, and temporarily storing the color patch input data values;

generating a set of matrix input data values which form a regular 3-dimensional matrix array of color values when expressed in the tri-color color space, the set of matrix input data values comprising all of the input color values that can be produced by the color scanning means;

for each of the matrix input data values, executing a computation to find one of the color patch input data values that is closest to the matrix input data value within the tri-color color space, and linking the matrix input data value to one of the color patch printing color values which corresponds to the closest color patch input data value, to establish the matrix input data value and the corresponding color patch printing color value as input and output values respectively of an initial color correction table;

executing 3-dimensional smoothing processing of all output values of the initial color correction table to obtain a final color correction table; and, storing the final color correction table in read-only memory means as the color correction table memory.

According to another embodiment of the invention, the aforementioned step of generating a set of matrix input data values further comprises steps of:

converting each of the matrix input data values to a corresponding color value expressed in a color space whereby metric lightness, metric chroma and metric hue attributes of a color are determined as respectively separate values;

for at least one of the attributes of the color value, executing color adjustment of the color value by multiplying the attribute by a predetermined factor or by adding to the attribute a predetermined value; and, reconverting each color value to a value expressed in the tri-color color space.

DESCRIPTION OF PREFERRED EMBODIMENTS

Figure 1:
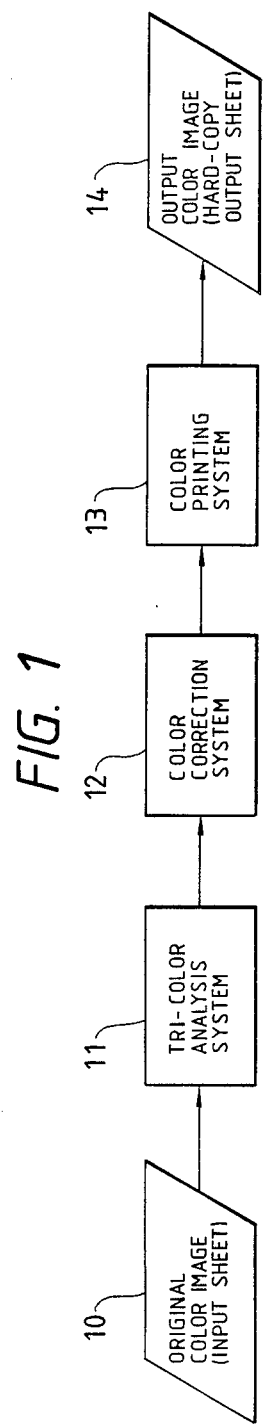
FIG. 1 is a general block diagram for illustrating the basic structure of a digital processing type of color copier.

Before describing specific embodiments of the present invention in detail, some necessary background information will be introduced, referring first to FIG. 1 which illustrates the basic configuration of a digital processing type of color copier apparatus in simplified block diagram form. Numeral 10 denotes an original color image, e.g. a color picture. The complete set of possible different colors (i.e. different combinations of red, green and blue, each combination having different chroma, hue and lightness color attributes) which can appear in such an original color image and can be resolved by the input system of the color copier apparatus will be designated as Ti. Such a set can be represented 3-dimensionally in a "color space" by an orthogonal coordinate system in which the attributes (lightness, hue and chroma) of a color are represented by a combination of three vectors (e.g. red, green and blue vectors, or cyan, magenta and yellow vectors). Such a color space will be referred to in the following as a "tri-color" color space, to distinguish it from a color space such as the L*u*v* color space in which the attributes of a color can be represented by mutually separate values. The original color image 10 is scanned by a light beam produced by a scanner system within a tri-color analysis system 11, and the resultant reflected light from the original color image thereby separated into three component colors (i.e. red, green, blue, respectively designated in the following simply as R, G and B. The tri-color analysis system 11 also includes a section for converting the R, G, B reflected light intensity values thus obtained into corresponding color density values (each being a combination of red, green and blue density values designated in the following as Dr, Dg, Db), i.e. values which are appropriate for color printing. Generally, such R,G,B color density values are in practice converted to their complementary color density values (cyan, magenta and yellow, respectively designated in the following simply as C, M and Y respectively) for printing purposes, and such conversion will be assumed to be necessary in the following.

The set of all possible Dr, Dg, Db color density values which can thus be produced from the tri-color analysis system will be designated in the following as D. This set of values can be can be represented as respective points in a Dr, Dg, Db tri-color color space. These input color density values are then transferred through a color correction system 12, which in a prior art color copier apparatus includes means for implementing the aforementioned color masking correction. Corrected color density values corresponding to the input color density values are thereby obtained, and are supplied to the printing system 13 to print an output color image 14 (e.g. with these corrected color density values being applied to determine degrees of modulation of a scanning light beam of a photo-sensitive drum as mentioned hereinabove). A complete set of these corrected color values will be designated in the following as X, where the term "complete set" signifies a set which extends from values providing maximum printing density of C, M and Y colors to values providing minimum density. The set X can also be represented as respective points in a (C, M, Y) tri-color color space. In this way, in response to these corrected color values, a (hard copy) output color image is printed. The set of all possible colors which can thus be printed is designated as $T_{opt}$, which as for D and X can be represented as respective points in a color space.

Figure 2:
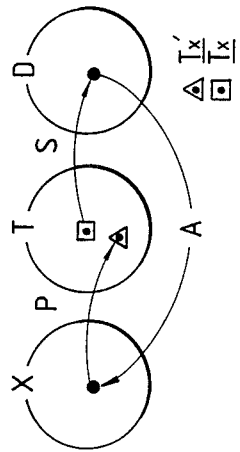
FIG. 2 is a diagram for illustrating the color scanning, correction and printing functions of the color copier of FIG. 1 as operations of mapping into successive color spaces.

FIG. 2 is a diagram for conceptually illustrating the basic operation of the color copier apparatus of FIG. 1, based on the color spaces D, X and T described above, with the input and output color spaces Ti and Topt shown mutually superimposed and designated collectively as T. Assuming that a color of an original color image in color space Ti is scanned and is processed by the system, and a corresponding color is printed out in the color space Topt, then ideally these input and output colors should be identical. In fact, if correction is insufficiently effective they will not be identical. In FIG. 2, an example of an input color is indicated by the square symbol Tx within the color space T. When this is scanned and processed and a resultant color printed in the output color image, the result may be as indicated by the triangular symbol Tx'. The system of FIG. 2 can be considered as a mathematical model, whereby the color value Tx is transferred by a mapping operation S into the D color space, then by a mapping operation A into the X space, then by a mapping operation P back into the T color space. The basic problem which must be solved by a color copier apparatus is to execute correction within the mapping operation A, from space D to space X, such that each output color Tx' will be brought as close as possible to the corresponding input color Tx, for all of the possible input colors which may occur.

In the prior art, masking correction has generally been of linear type, i.e. based on linear masking equations. Designating the color density values obtained from the tri-color analysis section 11 of FIG. 1 as Dr, Dg and Db respectively, and the corresponding C, M and Y complementary color values produced by color masking as Co, Mo and Do, these can be related by the following linear masking equations:

$$Co = a_{11}.Dr + a_{12}.Dg + a_{13}.Db$$

$$Mo = a_{21}.Dr + a_{22}.Dg + a_{23}.Db$$

$$Yo = a_{31}.Dr + a_{32}.Dg + a_{33}.Db$$

Ideally, it would be possible to select values for the coefficients $a_{11}$, $a_{12}$, etc. in the above equations such that each combination of Dr, Dg and Db color density values obtained by scanning a color region of an original color image would result in a combination of output color values Co, Mo and Yo being produced which when supplied to the printing section of the color copier apparatus would cause a color to be printed that would be close to that of the aforementioned region of the original color image. However in practice, due to non-linearity of operation of such a color copier printer system, accurate correction cannot be achieved by such linear masking.

To overcome this problem, it has been proposed in the prior art to utilize non-linear masking compensation, i.e. by utilizing high-order polynomial equations in place of the simple linear equations described above. However this is complex and difficult to implement in practice. Furthermore, in order to establish the values of the coefficients used in masking equations such as to achieve maximum accuracy of correction, a set of sample color regions of respectively different hue and/or lightness, generally referred to as color patches, can be printed out. That is to say, various printing data values (i.e. combinations of the values Co, Mo, Yo described above) are generated within the color copier, for producing a hard copy output sheet containing a number of differently colored regions. These are then scanned by the tri-color analysis system to obtain corresponding combinations of color density values Dr, Dg, Db. These color density value combinations and the corresponding printing data value combinations can then be utilized to determine appropriate values for the coefficients of the masking equations. That is, the coefficients can be established such that each Dr, Dg, Db color density value combination, when inserted into the equations, result in combinations of Co, Mo, Yo printing data values being produced as results from the equations which are substantially correct, i.e. which are closely similar to the original printing data value combinations used to produce the color patches.

Figure 3:
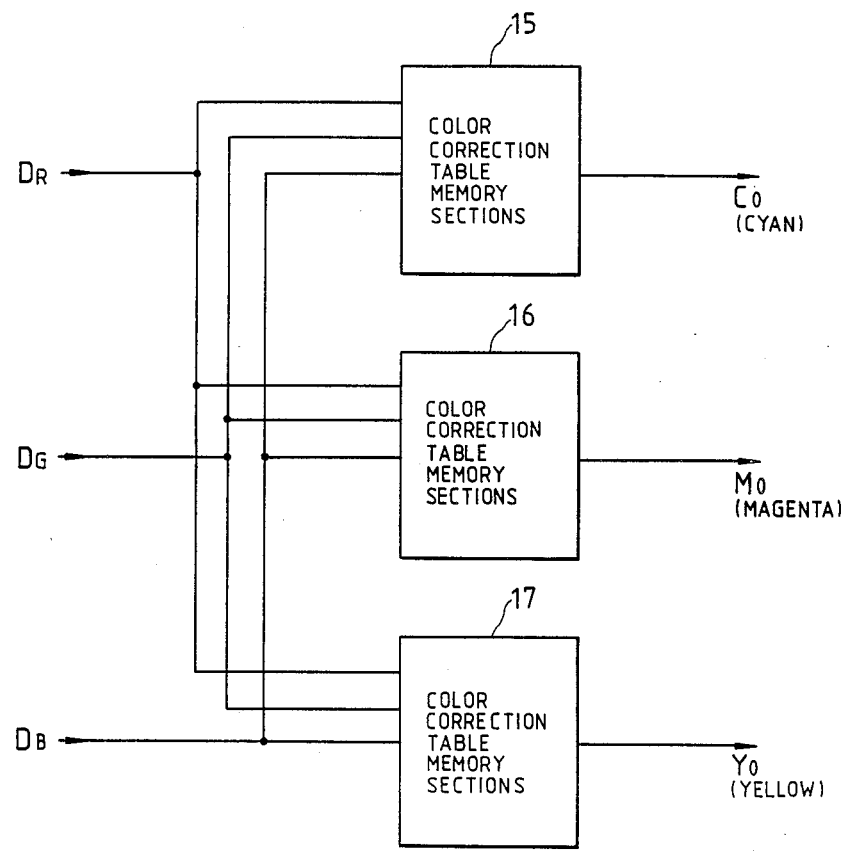
FIG. 3 is a simplified block diagram of a color masking table memory utilized in a prior art method of color correction for a color copier.

Having established values for the coefficients of the masking equations, by using color patch samples as described above or some other method, all of the possible color density values (i.e. all of the combinations of Dr, Dg, Db values) that can be produced from the tri-color analysis system of the color copier are then generated, and are inserted in to the masking equations to successively compute corresponding printing data value combinations Co, Mo, Yo. These values are then stored in a ROM (read only memory) as a table of related values, referred to in the following as a table memory. For example, each combination of color density values Dr, Dg, Db can be established as a memory address, so that when such a combination is inputted to the table memory (as a table input value) a corresponding combination of printing data values Co, Mo, Yo is produced (as a table output value). In practice the table memory will consist of a set of at least three ROMs 15, 16 and 17 as illustrated in FIG. 3, for producing the Co, Mo and Yo printing data values respectively. If the color copier is of a type whereby black is printed as a separate color (rather than being produced in the output color image by increased equal proportions of C, M, Y where required), then a fourth ROM may be required in the table memory, for producing the black printing data values (indicated in the following as K values).

Typically, approximately 100 different color patches are generated and printed for use in a prior art color masking method as described above. By using non-linear masking correction, fairly accurate results can be obtained for colors in an original color image which are close to or identical to those of the color patches. However the method does not provide satisfactory accuracy for colors which are significantly different from the sample color values of the color patches. It should be noted at this point that the range of color chroma values which can appear in an original color image is substantially wider than the range which can actually be printed by the color copier, e.g. wider than the possible range of chroma values of the color patches. For these reasons the various prior art color masking correction methods which have been developed, based upon linear masking equations or high-order polynomial masking equations, are of only limited effectiveness. In addition it is difficult with such a method to provide especially accurate color correction within certain ranges of chroma or of image lightness values. Furthermore if it is necessary to modify the colors in the output color image relative to those of the original color image, e.g. to provide a more "colorful" output color image with increased lightness or increased chroma values, for a more visually pleasing effect, then it is necessary to execute complex processing.

Figure 4:
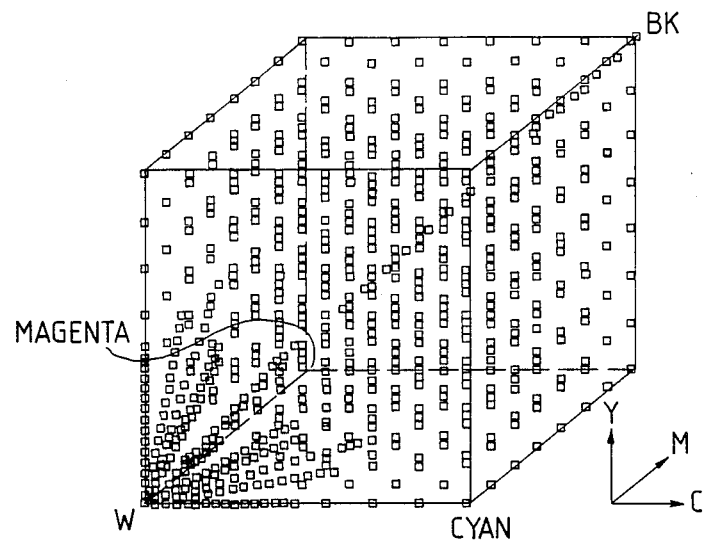
FIG. 4 shows an example of a C,M,Y (cyan, magenta, yellow) color space to illustrate printing data values utilized for printing color patches with a first embodiment of the method of the present invention.
Figure 5:
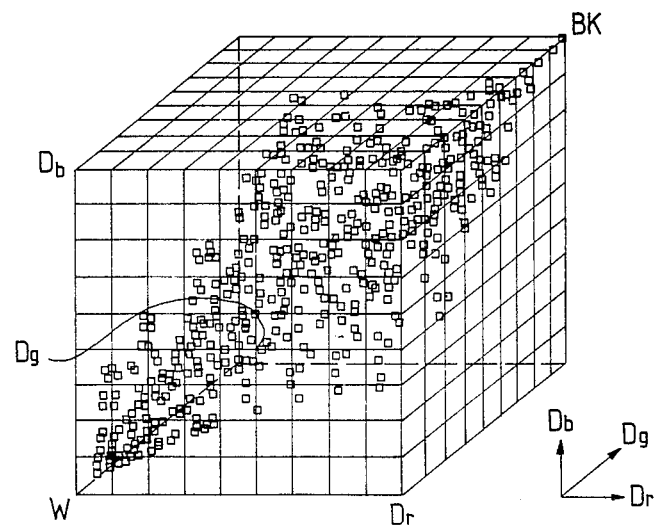
FIG. 5 shows a Dr, Dg, Db color space representing a 3-dimensional matrix array of all possible color density values obtainable by a scanning section of the first embodiment, and respective positions within that color space of Dr, Dg, Db color density values obtained by scanning and analyzing the color patches.

With a color correction method according to the present invention, a table memory is initially produced, i.e. as related sets of values stored in ROMs as in the prior art methods described above. However the method of the present invention basically differs from such prior art methods in that the values constituting the table memory used for color correction are not obtained by masking equation computations. Instead, these values are derived directly from printed color sample data, as described in detail in the following. With the method of the present invention, a set of $n$ printing data values, designated in the following as Xn is first generated, whereby a corresponding set of respectively different color patches is printed. The total number $n$ of these color patches is much greater than the number used in a prior art masking correction method, i.e. over 500 color patches with the method of the present invention, as opposed to approximately 100 or less in the case of a prior art method. An embodiment of the invention will be described in which a total of 729 color patches are generated. These consist of a set of 512 basic samples (i.e. combinations of 8 C values, 8 M values and 8 Y values), together with an additional 25 samples of low lightness value and 192 samples of high lightness value (i.e. where maximum "lightness" is pure white color, and the opposite is pure black). FIG. 4 illustrates the distribution within the X color space (described hereinabove) of the printing data values used to produce these color patch samples. The printing data values, and hence the corresponding color samples, are allocated respective designation numbers, from 0 to $(n-1)$, i.e. in this embodiment the color density values are numbered from 0 to 728. Having printed out these 729 color patches on a "hard copy" output sheet, this output sheet is transferred to the input scanning section of the color copier. A set of 729 color density values (designated in the following as $\hat{D}$) is thereby obtained, corresponding to the set of 729 color patches. This $\hat{D}$ set is illustrated in FIG. 5 as respective points within the tri-color D space (described hereinabove).

In this embodiment, designating the total number of possible color density values (Dr, Dg, Db combinations) that can be produced by the scanner/analyzer section of the copier as Dm, the value of Dm in this embodiment is 32,768, since in this embodiment there are 32 possible levels of R density Dr, 32 levels of Dg, and 32 levels of Db. These Dm color density values are respectively numbered from 0 to 32767. In order to prepare a table memory by the method of the present invention, which relates the printing data values (obtained by scanning the color patches) with the respective printing data values which produced these color patches, it is first necessary to relate each of the above 32,768 $\hat{D}$ space values to a specific one of the $\hat{D}$ space values, and hence with one of the aforementioned 729 X space (C,M,Y) printing data values. However as is clear from FIG. 5, the $\hat{D}$ set of color density values is not uniformly distributed throughout the D space, but is confined to a restricted region surrounding the achromatic color axis, i.e. a line connecting the maximum white color value W to the maximum black color value BK in FIG. 5. This is due to the practical limitations of the printing system of the color copier, i.e. the range of possible color density values that can be obtained by scanning a wide variety of original color images substantially exceeds the color reproduction capabilities of a printing system in a color copier manufactured for general use. Thus, a large number of the Dm color density values in the D color space will be outside the boundaries of the $\hat{D}$ region within that color space. Furthermore, many of the $\hat{D}$ values will not coincide with any specific one of the Dm values, but will be at some intermediate position within the D space.

Figure 6:
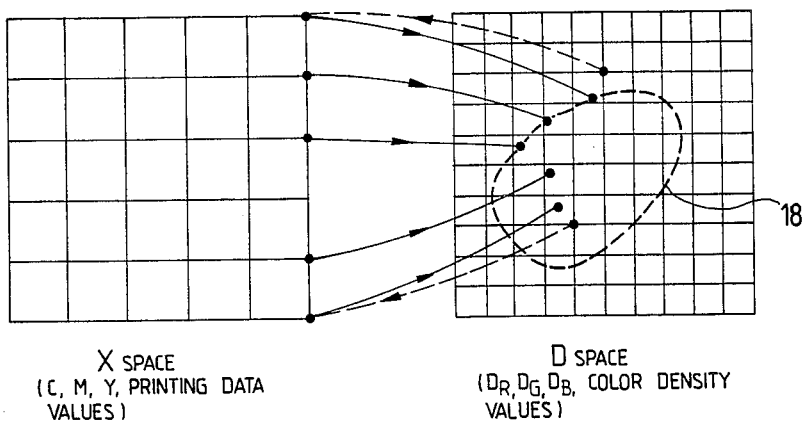
FIG. 6 is a 2-dimensional diagram for illustrating a process of mapping respective printing data values from the color space of FIG. 4 into the color space of FIG. 5, by utilizing the color density values of the color patches.

These points are more clearly illustrated in FIG. 6, which is a simplified diagram for illustrating in 2-dimensions the process of mapping printing data values (which produced the color patches) of the X color space to the D color space, to thereby relate each of the aforementioned Dm (Dr,Dg,Db) values to the $\hat{D}$ values obtained by scanning the color patches. The broken-line outline 18 shown within the D space in FIG. 6 represents the boundary of the $\hat{D}$ values, while the arrowed lines directed from the X space into the D space represent mapping of specific $\hat{D}$ values (i.e. color density values obtained by scanning specific color patches, and hence related to the printing data values used to produce these color patches) from the X space into the D space. It will be apparent that some of the D values will correspond directly to specific ones of the D values in this mapping operation, or will be close to correspondence. However many other $\hat{D}$ values, when mapped into the D space, will not correspond to any of the D space values. This is the case for D space values which are outside the D value boundary 18. It is also the case for where a $\hat{D}$ value is intermediate between several D space values, as indicated.

With the method of the present invention, for each of the m values of the D space (i.e. each of the possible color density values that can be obtained by scanning an original color image), the closest one of the $\hat{D}$ values is searched for and determined. This is done both for D space values which are outside the D~ boundary and for values which are within that boundary. This is of course equivalent to determining, for each color density value of the D space, the most closely corresponding one of the printing data values of the X space, i.e. determining the printing data value which would result in printing a color which, if subsequently scanned and converted to a color density value, would most closely approximate to the first-mentioned color density value. A relational table is thereby obtained which relates respective ones of the $m$ color density values of the D space (respectively numbered from 0 to (m−1)) to corresponding ones of the D~ values obtained by scanning the color patches as described above.

If such a relational table is used directly as a table memory for producing a printing data value in response to each input color density value obtained by scanning an original color image, and printing were to be executed using these printing data values, then it is found that abrupt changes in color density will occur in certain regions where in fact more gradual changes in density occur in the original original color image. This is due to a phenomenon whereby, during the process of preparing the aforementioned relational table, a plurality of different color density values of the D space may all be found to most closely correspond to a single D̂ value. This results from the fact that the total number m of possible color data values that can be obtained by color scanning/analysis is greater than the number $n$ of D̂ values, i.e. the number of color patches. For this reason, with the method of the present invention, after the aforementioned relational table for relating the printing data values of the D color space to the color density values of the X space, 3-dimensional smoothing of the table values is executed, so that more gradual changes in the magnitudes of successively numbered printing data values will occur. Correspondingly gradual variations in tone of the printed output color image can thereby be achieved.

It can thus be understood that with the method of the present invention, a table is drawn up which relates the set of $m$ color density values that can be obtained by tri-color analysis of an original color image to a set of printing data values which were utilized to produce a set of color patches, i.e. to a set of printing data values which will result in respective definitely known colors being printed by the particular printing system of the color copier. This table is then stored in ROM memory form, to establish a color correction table memory. Thereafter, each input color density value obtained during scanning of an original color image (i.e. each combination of of Dr, Dg and Db color density values for a unit region of the original color image) is applied as an input value to the table memory. A corresponding combination of C, M, Y printing data values, i.e. corrected color values, is obtained as output from the table memory, and supplied to the printing system of the color copier. In this way, referring back to FIG. 2 discussed hereinabove, the correction executed by data transfer through this table memory (basically corresponding to the mapping operation A in FIG. 2) results in each color value Topt of the output color image being brought close to the coresponding color value Ti, within the T color space. It can be understood from the above that with the method of the present invention, the values which are used in the color correction table memory are obtained directly based upon the particular operating characteristics of the scanning (tri-color analysis) system and printing system of each color copier. The correction which is thereby achieved by means of the color correction table memory is thus completely independent of the degree of non-linearity of the printing system operating characteristics, and independent of manufacturing variations between different color copiers. More satisfactory results can thereby be obtained than is possible in the case of a prior art color correction method in which color correction is executed based upon values obtained from computations performed using predetermined linear or non-linear color masking equations.

In addition, the method of the present invention enables enhanced correction accuracy to be obtained for desired regions of the spectrum or desired shades of color. Thus example in the case of the printing data values shown in FIG. 4, used to produce the color patches as described above, a greater number of printing data values are generated for producing color patches which are within the high lightness, i.e. "highlight" region.

The color correction method of the present invention also enables a plurality of different tables to be established to constitute a color correction table memory, for implementing respectively different types of correction. An embodiment of the invention is illustrated in FIG. 7, in which either of two color correction tables can be selected as required, for example tables which provide enhanced correction in respectively different color regions.

Figure 7:
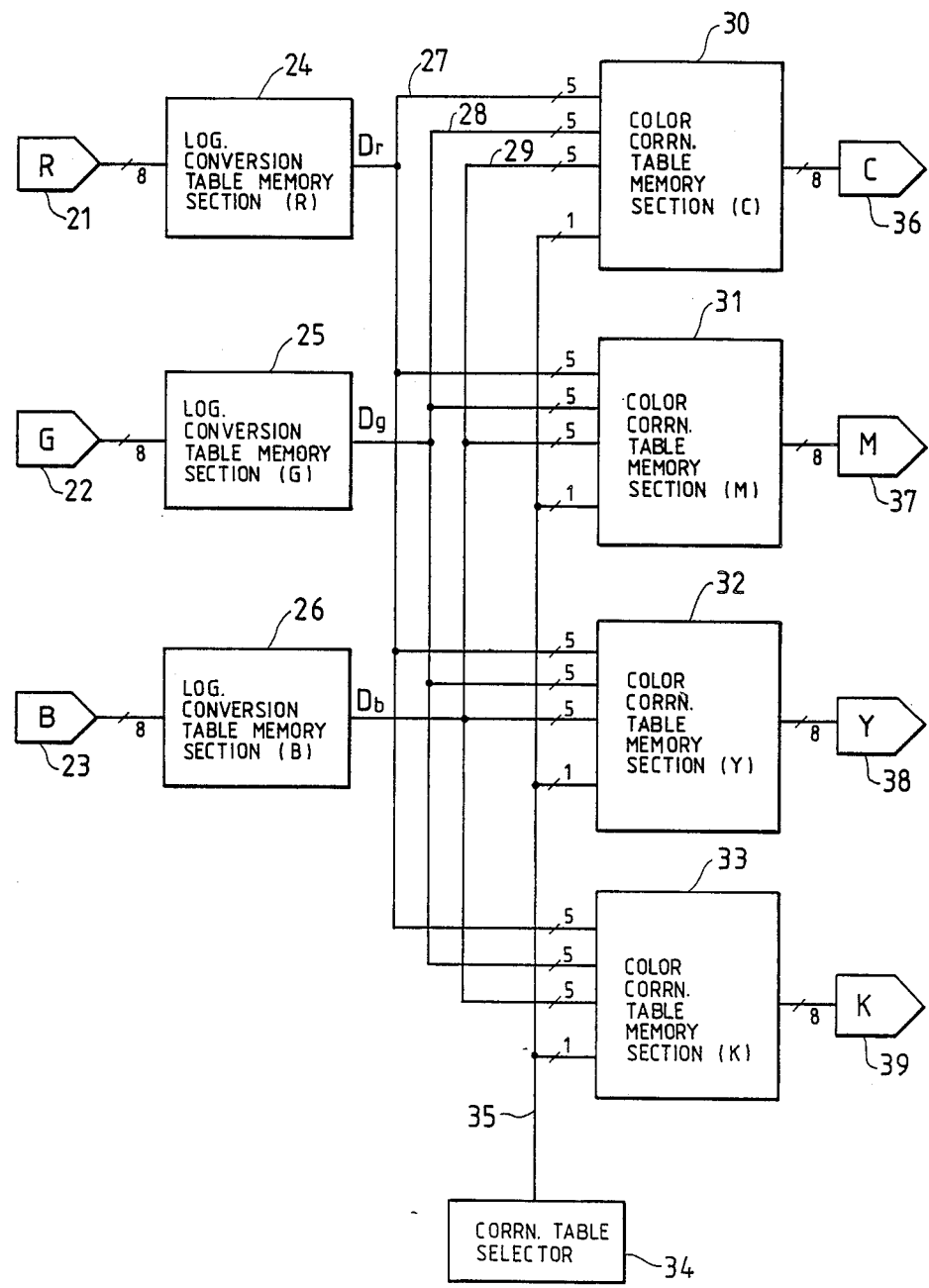
FIG. 7 is a block diagram of an embodiment of a logarithmic conversion table memory and a color correction table memory for a color copier utilizing the method of the present invention.

In FIG. 7; 21, 22 and 23 denote respective sets of 8-bit input signal lines which supply respective ones of R, G and B reflectance data values from the color scanner section of the color copier. These data values are obtained from tri-color separation signals produced based on reflected light from the original color image, and must be converted to corresponding color density values before being supplied to the color correction table memory. These R, G and B data values are therefore applied to respective logarithmic conversion table memory sections 24, 25 and 26, which produce corresponding color density values Dr, Dg and Db. Up to this point, all of the data values are expressed in 8-bit digital values. However only the most significant 5 bits of each Dr, Dg and Db output value from the table memory sections 24 to 26 are subsequently utilized, these being supplied over respective 5-bit data lines 27, 28 and 29 to the color correction table memory. This consists of four color correction table memory sections 30, 31, 22 and 33 for producing combinations of C, M, Y and K printing data values in response to input combinations of Dr, Dg and Db color density values, i.e. with each of these C, M, Y and K combinations determining respective amounts of cyan, magenta, yellow and black tones which are combined to produce a printed color by the printing section of the color copier. Each of the C, M, Y and K printing data values produced from the color correction table memory is an 8-bit value, and these are supplied to the printing system of the color copier (not shown in the drawings).

In this embodiment, two separate sets of color correction values are stored in the color correction table memory sections 30 to 33, i.e. this actually consists of a combination of two separate tables which can be selected as required. This selection is executed by control applied by a one-bit signal transferred over a data line 35 from a color correction table memory selector 34. In this way, two different types of color correction can be selected as required. These can for example be two types of correction which emphasise correction accuracy in respectively different color regions, e.g. with one of the tables of the color correction table memory emphasising accurate correction in the high lightness (highlight) region, and the other providing optimum correction for darker regions.

Figure 8:
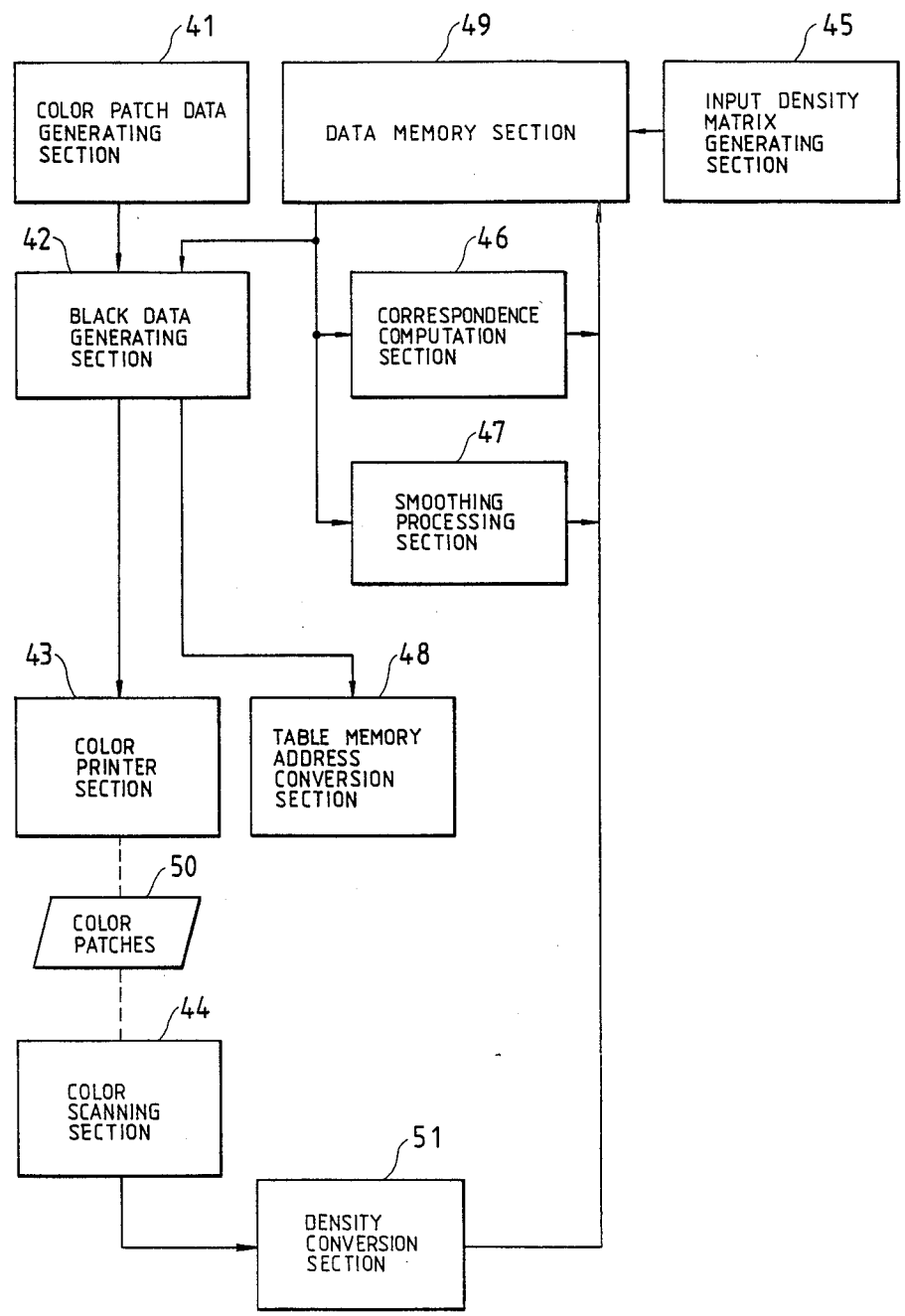
FIG. 8 is a functional block diagram for illustrating an example of the process of generating a color correction table memory by utilizing color patches, according to the method of the present invention.

A color copier apparatus to which the correction method of the present invention is applicable is basically controlled by a system controller, i.e. a suitably programmed digital microprocessor. FIG. 8 is a block diagram for illustrating the fundamental control operations executed in such a color copier in extremely simplified form. It should be understood that the functional blocks shown in FIG. 8 do not necessarily represent actual physical components of the color copier apparatus, but rather a function that is executed by the system controller. In FIG. 8, reference numeral 41 denotes a color patch data generating section which computes respective printing data values (each a combination of C, M and Y values) for a set of color patches. Numeral 42 denotes a black data generating section which receives the C, M, Y data value combinations from section 41 and produces in response to each of these combinations a corresponding combination of C, M, Y and K data values, where "K" denotes a black printing data value. In this embodiment, the portions of the output color image which are to appear totally black are printed by deposition of a black toner in the appropriate regions, rather than by forming these portions as a combination of successively superimposed layers of C, M and Y toner of respectively identical density. It is possible to utilize either the "full black" method of producing black areas in the output color image, in which the entire density of such a black area is produced by black ink, or to use the "skeleton black" method whereby part of the printing density of each black region of the output color image results from deposition of black toner material and part of the density results from a combination of C, M and Y toner layers of respectively identical density. Such methods of producing black regions of the output color image are well known in the art, and further description will be omitted. The K component of each C, M, Y, K printing data value combination produced from the black data generating section determines the amount of black toner that is deposited in the corresponding region of the output color image.

These C, M, Y, K printing data values are supplied to the color printer section 43. Numeral 50 denotes a color patch set which have been printed by the color printing section 43. Numeral 44 denotes the color scanning section, which executes scanning of the original color image (in this case, the color patches 50) and generation of corresponding tri-color RGB light reflectance values as described hereinabove. These RGB reflectance values are successively converted to corresponding color density values Dr, Dg, Db by a density conversion section 51. 45 denotes an input density matrix generating section, which functions to generate all of the possible input color density values (i.e. combinations of Dr, Dg, Db color density values) which can be produced from the color scanning section 44. These are disposed at regular spacings within a color space as illustrated in FIG. 5, i.e. an orthogonal coordinate system in which Dr, Dg and Db color density values are plotted along the respective axes, with pure white color corresponding to zero values of each of Dr, Dg and Db and with pure black color corresponding to maximum values of each of Dr, Dg and Db. Each of the Dr, Dg, Db combinations produced from the input density matrix generating section 45 therefore is represented by a unique corresponding point within this Dr, Dg, Db color space, with the complete set of these points representing a regular 3-dimensional matrix array of values within that space. These Dr, Dg, Db color density combinations produced from the input density matrix generating section 45 will therefore be referred to as density matrix values in the following, and the complete set of these density matrix values within the Dr, Dg, Db color space will be referred to as the density matrix value set. In this embodiment, this density matrix value set consists of 32,768 values, i.e. 32,768 Dr, Dg, Db combinations, to each of which is allocated a corresponding serial number, referred to as the color number.

Numeral 46 denotes a correspondence computation section, which functions to find, for each of the density matrix values produced from the input density matrix generating section 45, the one of the Dr, Dg, Db color density combinations obtained from the color scanner section 44 (by scanning and analyzing the color patches 50) that is closest (i.e. in the D color space) to that density matrix value. That is to say, the color patch that is closest in color to that density matrix value is computed, as described hereinafter. These Dr, Dg, Db values obtained from the color scanner section 44 are for example as illustrated in FIG. 5, distributed non-uniformly within a restricted region of the D color space as described above. When this correspondence has been established for a density matrix value produced from the input density matrix generating section 45, the correspondence computation section 46 can then establish a correspondence between that density matrix value and the printing data value (i.e. C, M, Y printing color combination) used to produce the aforementioned corresponding color patch. In this way, a table is produced by the correspondence computation section 46 which relates each of the density matrix values produced from the input density matrix generating section 45 with a specific (C, M, Y) printing data value, this table thus having been produced directly based upon the printed color patches, rather than by utilizing predetermined masking equations as in the prior art.

In practice, some errors will occur in the process of determining the closest color patch value for each density matrix value. For example, a number of different color density values (obtained by scanning the color patches 50) may all be determined as closest to a particular density matrix value. Such problems will result in a certain number of abrupt large-magnitude step changes in C,M,Y,K printing data values being produced from the initial color correction table thus obtained, in response to gradual changes in input density matrix value number. Numeral 47 denotes a smoothing processing section, for executing 3-dimensional smoothing of the C,M,Y,K printing values of the initially obtained color correction table, in order to overcome this problem of abrupt changes in output values from the table.

Numeral 48 denotes a table memory address conversion section, for allocating appropriate memory address valued to the color correction table thus obtained by smoothing processing, to thereby form a color correction table memory.

Intermediate results and final results the processing operations described above are stored in a data memory section 49.

Intermediate results and final results the processing operations described above are stored in a data memory section 49.

Figure 9:
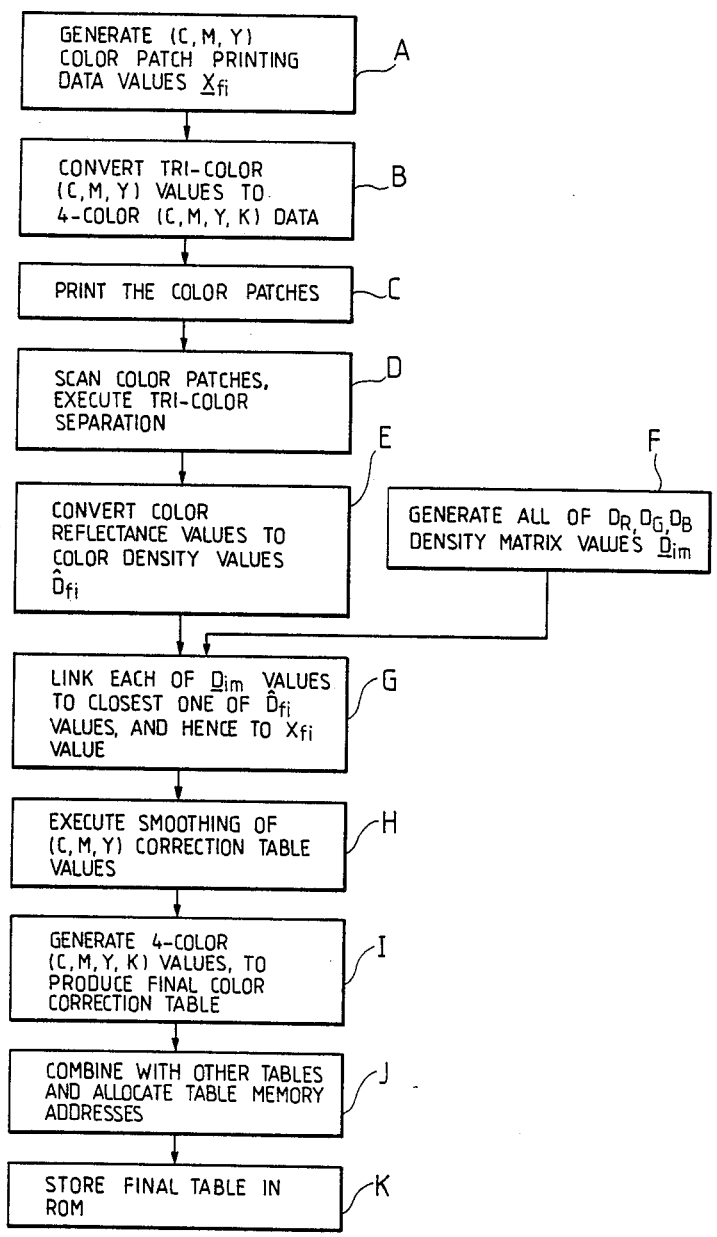
FIG. 9 is a flow diagram corresponding to FIG. 8, for assistance in describing successive processing steps.

The operation of this system will be described in more detail referring to the flow chart of FIG. 9. In an initial operation step A, the C,M,Y color patch data generating section 41 generates a file consisting of the set of C,M,Y printing data values for producing the color patches 50. These printing data values preferably extend over the entire dynamic range of printer drive levels of the color printing section 43, and can be represented in C,M,Y color space as shown in FIG. 4, with a total of 512 basic color patch printing values (i.e. each consisting of a combination of cyan, magenta and yellow colors). The proportion of each of these C, M and Y colors in a printing data value can be varied in 8 gradation steps.

In addition to the basic 512 color patches, additional color patches within the dark region and highlight region of the copier reproduction range are also produced, for a total of 729 color patches as described hereinabove. Alternatively, additional color patches can be produced which lie along the "gray scale" achromatic color axis (between the W and BK points in FIG. 4).

To generate the color patches 50, the color patches are allocated respective color numbers, designated in the following as fi (i.e. where fi=0 to ($f_{i\,max}-1$). Correspondingly, the respective printing data values for producing these color patches will be designated as $X_{fi}$, where each value is a C,M,Y combination. The appropriate printing data values $X_{fi}$ for the color patch colors fl are respectively computed by the C,M,Y color patch data generating section 41, using a predetermined equation.

In the next operation step B, a black component value K is derived for each of the $X_{fi}$ C,M,Y printing data value combinations obtained in step A. This step can of course be omitted in the case of a color copier having a tri-color printing system in which a black region is reproduced by superimposed layers of C,M and Y toners. However the color printing section 43 of this embodiment is of 4-color type, in which black is printed by a separate toner layer, separately from the C, M and Y color components. The black component K is preferably derived by the "skeleton black" method referred to hereinabove. Each of the printing data values thus produced from the black data generating section 42 thus consists of a combination of C,M,Y and K values. These printing data values of the color patch data file are supplied to the color printing section 43 to print the color patches 50.

It should be noted here that the method of the present invention is applicable to any type of printer system, i.e. color reproduction accuracy is made completely independent of the reproduction characteristics of the particular printing system, so long as the printer operation that is executed during printing of the color patches 50 is identical to that which is subsequently executed during normal color copying operation.

Next, in step C, the color patches 50 are printed, i.e. as a hard-copy sheet.

In the next operation step D, the color patches 50 are scanned and the results subjected to tri-color separation by the color scanner section 44, and the resultant color reflectance signals are converted from analog to digital form to obtain successive combinations of R,G,B (reflectance color) data values. The values thus obtained are then successively converted to corresponding Dr, Dg, Db color density values by the density conversion section 51. If a "dither" printing technique is utilized then it is possible that moire patterns may be produced within the digital data obtained during this process of reading the color patch hard copy output sheet 50. To prevent such moire pattern generation, it may be necessary to defocus the optical system of the color scanner section 44 which is used to scan the color patches.

It should be noted that rather than utilizing the color scanner section 44 of the color copier as described above, it would be equally possible to utilize an indirect method of reading in the color patch data, by using a separate color measurement device. If this is done, then it is necessary to establish beforehand the relationships between RGB data values that are obtained by the color scanner section 44 and corresponding tristimulus color values XYZ obtained using the color measurement device, and to execute conversion of the XYZ values to respective RGB values by matrix computation.

In the next step E, the RGB (reflectance) data values obtained as described above, representing relative reflected light intensity values, are converted to respectively corresponding color density data values Dr, Dg, Db by the density conversion section 51. A file of color patch color density values which have been read in is thereby produced, and temporarily stored in the data storage section 49. This data will be designated as $\hat{D}_{fi}$, where $\hat{D}_{fi}=(\hat{D}r_{fi}, \hat{D}g_{fi}, \hat{D}b_{fi})$. Here, fi=0 to $f_{(i\,max)}-1$.

In step F, the set of Dr, Dg, Db density matrix values described hereinabove are generated by the input density matrix generating section 45. These constitute all of the possible color density values that may be inputted to the completed color correction table memory. In this embodiment since there are 32 possible values for each of the Dr, Dg and Db density levels respectively, so that there is a total of 32×32×32=32,768 of these density matrix values. This set of data will be designated as $D_{im}$, where $D_{im}=(Dr_{im}, Dg_{im}, Db_{im})$. In this embodiment, im=0 to 32,767.

In step G, the set of density matrix values $D_{im}$ is scanned from im=0 to im=($im_{max}-1$), and for each of these density matrix values (each consisting of a combination of $Dr_{im}$, $Dg_{im}$ and $Db_{im}$ density values) the closest one within the D space of the $D_{fi}$ values is found. This is done by finding, for each of the density matrix values $D_{im}$, the $D_{fi}$ value (consisting of a combination of $Dr_{fi}$, $Dg_{fi}$ and $Db_{fi}$ values, obtained by scanning and analyzing a corresponding one of the color patches 50) which is such that a quantity $\|D_{im}-\hat{D}_{fi}\|^2$ is minimized, where $\|D_{im}-D_{fi}\|^2=(Dr_{im}-\hat{D}r_{fi})^2+(Dg_{im}-\hat{D}g_{fi})^2+(Db_{im}-\hat{D}b_{fi})^2$. This method of determining relationships between the density matrix values and the Dr, Dg, Db color density values $\hat{D}_{fi}$ obtained from the color patches 50 is preferable, since as described hereinabove with reference to FIG. 5, these Dr, Dg, Db color density values $\hat{D}_{fi}$ are distributed non-uniformly within the D space, whereas the density matrix values are distributed uniformly throughout that space. Moreover these Dr, Dg, Db values $\hat{D}_{fi}$ are contained within a restricted region of the D space as shown in FIG. 5, due to practical limitations of the printer system. The above method which is based on determining minimum values of $\|D_{im}-\hat{D}_{fi}\|^2$ has the effect of linking density matrix values that lie outside that region containing the color density values $\hat{D}_{fi}$ to the respective closest points thereto which are on the periphery of that region. In this way, the color printing section 43 used to the limits of its color reproduction capabilities, when reproducing colors of an original image which actually are beyond these reproduction capabilities. In this way, the optimum possible performance can be obtained from each color printing system, irrespective of its individual characteristics.

Since the $X_{fi}$ C,M,Y printing data value combinations corresponding to respective ones of these $D_{fi}$ color patch density values are known, an initial color correction table is thus produced in which each of the density matrix values $D_{im}$ is linked to a corresponding one of the $X_{fi}$ printing data values.

In step H, the following operations are executed. Firstly, the initial color correction can produce a maximum number of possible output printing data values that is identical to the number of (C,M,Y) printing data values of the set $X_{fi}$ used to produce the color patches 50, i.e. 729 values in this embodiment. Thus there will be many more possible color values that may be inputted to the color correction table than the number of values that can be produced from the table in response. This is of course due to the limited number of the color patches 50. As a result, if such a color correction table were to be directly utilized, there would be a lack of continuity of color variations, i.e. conspicuous stepwise jumps in color density would occur in the output color image in regions where only gradual color variations occur in the original color image. To overcome this, the initial color correction table extablished in step H above is subjected to 3-dimensional smoothing processing, by the smoothing processing section 47. Interpolation of output printing data values into the table is thereby executed, to thereby ensure that smooth variations in color density can be produced in an output color image printed by the color copier. This smoothing is executed within the color space D illustrated in FIG. 5, for each of successive regions of that D space, each consisting of a $3\times3\times3$ set of three-dimensional matrix values Smoothing processing is applied to each of the C, M and Y component values of each printing data value. For example in the case of the C component, smoothing is executed to obtain a smoothed value $C'_{(Dr, Dg, Db)}$, which is computed as:

$$C'_{(Dr, Dg, Db)} = \frac{1}{27} \sum_{l=-1}^{1} \sum_{m=-1}^{1} \sum_{n=-1}^{1}$$

In the above, $0 \geq Dr \geq 31$, $0 \geq Dg \geq 31$, $0 \geq Db \geq 31$.

A completed color correction table is obtained as a final result of this smoothing processing.

When the next step I is reached, then at this point a color correction table has been generated which relates the density matrix value set $D_{im}$ (generated in step E above) to respectively appropriate C,M,Y printing data values. In step I, a set of K (i.e. black) printing data values are derived from these C,M,Y printing data values by the same procedure which was used to obtain K data values in step B described hereinabove, to thereby obtain a set of C,M,Y, $K_{(C,M,Y)}$ printing data values, i.e. each of which is a combination of cyan, magenta, yellow and black color values. A completed color correction table is thereby produced, in which the density matrix value set Dim is related to this set of C, M, Y, K(C,M,Y) printing data values (referred to in the following simply as the C,M,Y,K output printing data values).

Table 1 below shows an example of a group of consecutively numbered colors of the initial color correction table obtained as described above, prior to smoothing processing, illustrating how each input Dr, Dg, Db color density value is related to a specific output C,M,Y printing color value. As can be seen from Table 1, some abrupt changes in the C,M,Y output values occur in relation to gradual changes in input color density value. Table 2 shows a corresponding portion of the final color correction table, after 3-dimensional smoothing has been applied as described hereinabove to the initial color correction Table 1. It is apparent that much more gradual successive changes occur in the C,M,Y output values from Table 2 in relation to gradual changes in input Dr, Dg, Db color values.

TABLE 1

| 3-COLOR (NO.) | Dr | Dg | Cb | C | M | Y |
|---|---|---|---|---|---|---|
| 0 | 40 | 40 | 0 | 0 | 60 | 0 |
| 1 | 40 | 40 | 8 | 0 | 70 | 0 |
| 2 | 40 | 40 | 16 | 0 | 0 | 60 |
| 3 | 40 | 40 | 24 | 20 | 0 | 50 |
| 4 | 40 | 40 | 32 | 56 | 0 | 112 |
| 5 | 40 | 40 | 40 | 0 | 80 | 0 |
| 6 | 40 | 40 | 48 | 36 | 0 | 72 |
| 7 | 40 | 40 | 56 | 36 | 0 | 72 |
| 8 | 40 | 40 | 64 | 36 | 0 | 72 |

TABLE 1-continued

| 3-COLOR (NO.) | Dr | Dg | Cb | C | M | Y |
|---|---|---|---|---|---|---|
| 9 | 40 | 40 | 72 | 36 | 0 | 108 |
| 10 | 40 | 40 | 80 | 36 | 0 | 108 |
| 11 | 40 | 40 | 88 | 36 | 0 | 144 |
| 12 | 40 | 40 | 96 | 36 | 0 | 180 |
| 13 | 40 | 40 | 104 | 36 | 0 | 252 |
| 14 | 40 | 40 | 112 | 36 | 0 | 252 |
| 15 | 40 | 40 | 120 | 36 | 0 | 252 |

TABLE 2

| 3-COLOR (NO.) | Dr | Dg | Db | C | M | Y |
|---|---|---|---|---|---|---|
| 0 | 40 | 40 | 0 | 11 | 48 | 6 |
| 1 | 40 | 40 | 8 | 20 | 36 | 13 |
| 2 | 40 | 40 | 16 | 32 | 24 | 20 |
| 3 | 40 | 40 | 24 | 45 | 25 | 32 |
| 4 | 40 | 40 | 32 | 43 | 25 | 36 |
| 5 | 40 | 40 | 40 | 34 | 23 | 40 |
| 6 | 40 | 40 | 48 | 26 | 10 | 44 |
| 7 | 40 | 40 | 56 | 24 | 7 | 55 |
| 8 | 40 | 40 | 64 | 26 | 3 | 75 |
| 9 | 40 | 40 | 72 | 28 | 2 | 97 |
| 10 | 40 | 40 | 80 | 27 | 0 | 121 |
| 11 | 40 | 40 | 88 | 25 | 0 | 148 |
| 12 | 40 | 40 | 96 | 24 | 1 | 185 |
| 13 | 40 | 40 | 104 | 24 | 1 | 217 |
| 14 | 40 | 40 | 112 | 22 | 4 | 233 |
| 15 | 40 | 40 | 120 | 19 | 8 | 234 |

This embodiment has been described in the above assuming that as accurate reproduction as possible of the original color image is required. It may however be desired to produce an output color image in which colors are not faithful reproductions of those in the original color image, e.g. to produce an output color image in which colors appear brighter than those of the original image, rather than to achieve maximum accuracy of reproduction. This may be done to achieve a more visually pleasing effect. One simple method of achieving this is to ensure that the amounts of black color represented by the K printing data values produced in step I are less than those represented by the K values produced in step B described hereinabove, i.e. by making the proportion of the C, M, Y components used to derive the K component in step I less than the corresponding proportion used in step B. This can be achieved, for example, by utilizing the "full black" method of deriving the K components in step B, and the "skeleton black" method in step I.

Furthermore, it may be desired to combine two or more color correction tables, respectively derived separately by the process described above, into a single color correction table memory. A block diagram of such a color correction table memory has been described above referring to FIG. 7, for the case of two color correction tables being combined, with either of these being selectable as required. Combining two or more different color correction tables into a table memory in this way is executed in step J of the flow chart of FIG. 9, in which addresses are also allocated to the color correction tables, to obtain the final color correction table memory.

In the next step K, the table memory data from step J are permanently stored into ROM (read only memory) elements, to obtain the completed color correction table memory in physical form, e.g. as an IC chip. This is then connected into the circuit of the color copier.

It should be noted that the method of the present invention is not limited to the specific numeric values utilized for the above embodiment, e.g. for the number of color patches, number of density matrix values, etc.

The color correction method of the present invention as described hereinabove has been found to be highly effective for implementing a color copier apparatus providing accurate color reproduction with a simple hardware configuration, with the accuracy of color reproduction being substantially independent of individual variations in color printing system and color analyzer system characteristics and independent of nonlinearity of these characteristics. The method also enables increased accuracy of compensation to be achieved in specific localized regions of a color space, e.g. in the highlight region, etc, with only very simple computation operations being necessary.

Figure 10:
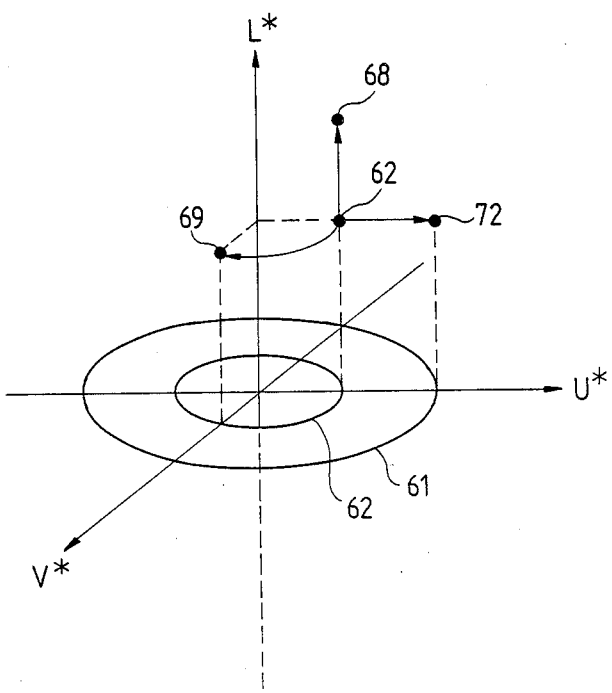
FIG. 10 is a diagram for illustrating the concept of representing color values in an L*u*v* color space.

With the Dr, Dg, Db tri-color color space described hereinabove, e.g. as illustrated in FIG. 5, a color density value is expressed as a combination of three vector quantities, which combination defines both the chrominance and the lightness characteristics of the color. However it is equally possible to express a perceived color value by means of a color space in which lightness (i.e. values lying along the W - BK line in FIG. 5) and chrominance are defined by mutually separate vectors. Examples of this are the L*u*v* and the L*a*b* Uniform Color Spaces. In such a uniform color space, it is intended that equal distances moved within that space will represent color differences of equal magnitude, as judged by an individual who views the color under fixed viewing conditions and fixed illumination level. The terms "metric lightness", "metric chroma" and "metric hue-angle" as used in the following are as defined by the CIE recommendations concerning Uniform Color Spaces, Color-Difference Equations, and Metric Color Terms (CIE 1976). FIG. 10 illustrates the L*u*v* space, in which metric luminance values (i.e. lightness values, in the case of an image viewed by reflected light) vary along a vertical axis designated as L*, while values of metric chroma and hue-angle are expressed in a plane which is perpendicular to that L* axis. In this plane, successively increasing distances from the L* axis correspond to increased values of metric chroma, while angular changes about the L* as center of rotation correspond to changes in hue, more specifically, in metric hue-angle. The (positive-direction) U* axis corresponds to a specific red hue, the (positive-direction) V* axis (perpendicular to the U* axis) corresponds to a specific blue hue. Thus, the circle 62 in the U*V* plane represents colors of mutually identical metric chroma and differing hues, as does the circle 61, with the colors of circle 62 being of lower metric chroma than those of circle 61. Points 62 and 69 represent two colors of equal metric chroma and different hue, point 68 represents a color of identical hue to that of point 62 and increased lightness, while point 72 represents a color of identical hue to that of points 62 and 68, but increased metric chroma.

Any values expressed in the Dr, Dg, Db (or C,M,Y) color space utilized in the previous embodiments can be converted and reconverted to/from corresponding L*u*v* space values by appropriate computations as described in the following. An embodiment of the present invention will be described in which a plurality of color correction tables are utilized, with one of these ts having been produced as described for the previous embodiment, and the remaining tables containing C, M, Y output data values which, in addition to being color-corrected values, have also been subjected to color adjustment, by processing which includes conversion to L*u*v* values, adjustment of chroma or hue, and reconversion to C,M,Y values. Thus by selecting respective ones of these color correction tables to be utilized, a specific degree of chroma or hue adjustment of the output color image can be executed by the user if required.

For convenience of processing, each color value converted into an L*u*v* value is then converted into an $L^*C^*_{uv}H^o_{uv}$ value (i.e. expressed as a L* coordinate together with chroma $C^*_{uv}$ and hue angle $H^o_{uv}$ polar coordinates in the u*v* plane). Adjustement of chroma or lightness is then executed on the $L^*C^*_{uv}H^o_{uv}$ value, which is then reconverted to an L*u*v* value, and hence back to a C,M,Y value. In practice, it is necessary to convert each C, M, Y color value to an R, G, B reflectance color value, convert that to a color value expressed in tristimulus coordinates X, Y, Z, convert that to a value expressed in L*u*v* coordinates, and hence to an $L^*C^*_{uv}H^o_{uv}$ coordinate value. Reconversion back to a C, M, Y value is executed in the reverse sequence.

In this embodiment, each of a plurality of tables is generated for conversion from input Dr, Dg, Db color density values (obtained by logarithmic conversion of tri-color reflectance values produced from the color scanner section of the color copier, as described above) to corresponding C, M, Y values to be supplied to the printer section, whereby both color correction of these C, M, Y values and also adjustment of hue, chroma or lightness of the output color image. Each of these color correction and color adjustment tables is produced as follows. Referring to the flow chart of FIG. 9 for the previous embodiment, a set of density matrix values (i.e. all of the possible Dr, Dg, Db color density values, each representable as a point in the D space, which can be produced from the color analyzer section of the printer) are generated in an operation step F, and are temporarily stored. The closest of the C, M, Y color patch printing values to each of these density matrix values is subsequently found, in step G, to produce the initial color correction table as described above. However in the present embodiment in which both color correction and color adjustement are executed, the operating step F of FIG. 9 is modified by converting each of the Dr, Dg, Db density matrix values generated therein to a corresponding $L^*C^*_{uv}H^o_{uv}$ value, performing a specific degree of chroma, hue or lightness adjustment is of that $L^*C^*_{uv}H^o_{uv}$ value, and reconverting the adjusted $L^*C^*_{uv}H^o_{uv}$ value back to a Dr, Dg, Db density matrix value. Subsequent processing to obtain a final color correction and color adjustment table is identical to that described for the previous embodiment, i.e. consisting of steps G, H, and I in FIG. 9. It will be apparent that since the C, M, Y output values in this final table have been derived (in step G of FIG. 9, as described hereinabove for the first embodiment) by utilizing a set of color-adjusted density matrix values, these C, M, Y output values will also be accordingly color adjusted. In this way, the required degree and type of color adjustment, in addition to the color correction that has been described for the previous embodiment, will be applied to an output color image that is printed by utilizing C,M,Y values produced from this table.

A plurality of such color correction +color adjustment tables are successively produced, together with at least one table which provides only color correction, and these tables are then combined and stored in ROM form, e.g. by steps I, J and K in FIG. 9 described hereinabove, as a color correction/adjustment table memory.

Figure 11:
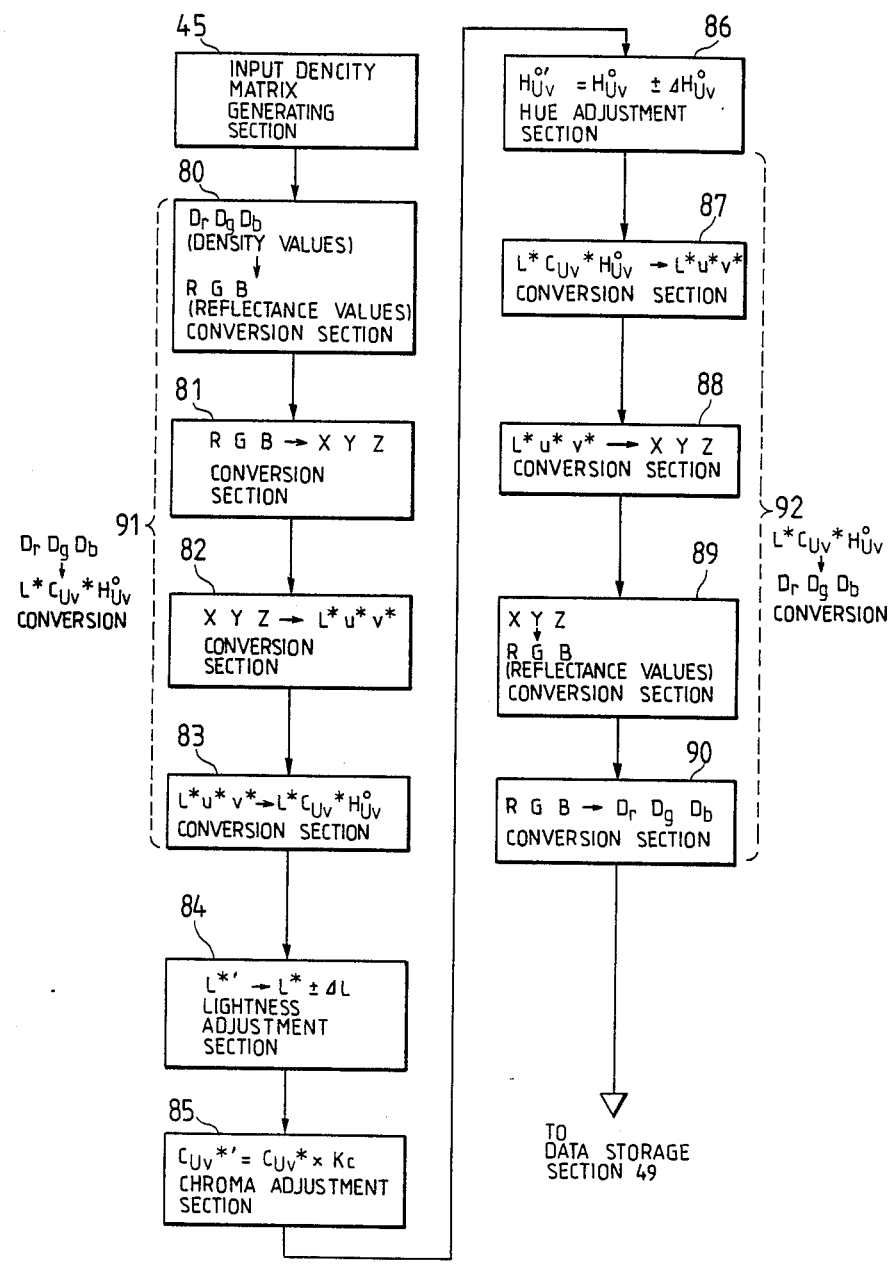
FIG. 11 is a block diagram for illustrating operation of an embodiment of the method of the present invention whereby color correction can executed in conjunction with adjustment of lightness, chroma and hue color attributes.

The process of conversion of each Dr, Dg, Db density matrix value to $L^*C^*_{uv}H^o_{uv}$ form to execute color adjustment, and subsequent reconversion, can be more readily understood from FIG. 11, which can be interpreted as a supplementary set of data processing sections in addition to those of FIG. 9 described hereinabove. As stated previously, such a diagram is intended purely for illustration, and the actual processing operations are in fact executed by a suitably programmed CPU or computer. The input density matrix generating section 45 operates as described for FIG. 9, to produce successive ones of all of the possible Dr, Dg, Db input color density values that can be outputted from the color analyzer section of the color copier. Such a Dr, Dg, Db value is then converted to an R,G,B reflectance value by conversion section 80, and this R,G,B value is converted to an X,Y,Z tristimulus value by conversion section 81. The X,Y,Z tristimulus value is then converted to a $L^*u^*v^*$ coordinate form by conversion section 82, and this is converted to an $L^*C^*_{uv}H^o_{uv}$ value by the conversion section 82.

A desired amount of change in metric lightness ($L^*$) is then executed by the conversion section 84 by addition or subtraction of an amount $\Delta L$, a desired amount of change of metric chroma ($C^*_{uv}$) is then executed by the conversion section 85 by multiplication by a factor Kc, and a desired amount of change in metric hue-angle $H^o_{uv}$ is executed by the conversion section 86, by addition or subtraction of an angular amount $\Delta H^o_{uv}$.

Reconversion of the color-adjusted $L^*C^*_{uv}H^o_{uv}$ value thus obtained is executed, in the reverse process to the conversion described above, by sections 87, 88, 89 and 90, which execute conversion from $L^*C^*_{uv}H^o_{uv}$ to $L^*u^*v^*$ form, from $L^*u^*v^*$ to X,Y,Z form, from X,Y,Z to R, G, B form, and from R,G, B to Dr, Dg, Db form, respectively. The subsequent operation is identical to that described for FIG. 9 hereinabove.

The various computations for executing the conversion and reconversion operations described above are based on the relationships given in Table 3 below.

TABLE 3

$D_r, D_g, D_b \rightarrow$ RGB $$\left. \begin{array}{l} D_r = -10^{-R} \\ D_g = 10^{-G} \\ D_b = 10^{-B} \end{array} \right\} \quad 0 \leq \begin{array}{l} R \\ G \\ B \end{array} \leq 1,$$

$$0 \leq \begin{array}{l} D_r \\ D_g \\ D_b \end{array}$$

RGB → XYZ $$\begin{pmatrix} X \\ Y \\ Z \end{pmatrix} = \begin{pmatrix} 0.607 & 0.174 & 0.201 \\ 0.299 & 0.587 & 0.114 \\ 0.000 & 0.066 & 1.117 \end{pmatrix} \begin{pmatrix} R \\ G \\ B \end{pmatrix}$$

XYZ → $L^*u^*v$ $L^* = 116(Y/Y_o)^{\frac{1}{3}} - 16$
$u^* = 13L^* (u' - u_o') \quad u' = 4X/(x + 15y + 32)$
$u^* = 13L^* (v' - v_o') \quad v' = 9Y/(x + 15y + 32)$ $L^*u^*v^* \rightarrow L^*C_{uv}^* H_{uv}^o$ $H_{uv}^o = \tan^{-1} v^*/u^*$
$C_{uv}^* = (u^{*2} = v^{*2})^{\frac{1}{2}}$ With this embodiment, a total of four tables are combined into single table memory, i.e. one color correction table (with no color adjustment function), one color correction +color adjustment table which produces increased chroma relative to an original color image, and two color correction +color adjustment tables which produce respectively different shifts in hue relative to the original color image. The specifications of these tables are given in Table 4 below.

TABLE 4

| Table No. | Lightness adjustment factor | Chroma adjustment factor | Hue angle adjustment amount | Adjustment type |
|---|---|---|---|---|
| 0 | 0 | 1 | 0 | No adjustment |
| 1 | 0 | 1.5 | 0 | Chroma increase |
| 2 | 0 | 1 | +30° | Hue (+) adjustment |
| 3 | 0 | 1 | −30° | Hue (−) adjustment |

Thus by selecting respective ones of these tables, it is possible to establish four corresponding reproduction modes for the color copier, i.e Mode 0: No color adjustment.

Mode 1: Enhancement of all chroma values by an identical factor, for a visually more "colorful" output color image.

Mode 2: Shift of all hues by an identical amount in one direction (metric hue-angles each shifted by +30°).

Mode 3: Shift of all hues by an identical amount in the opposite direction (metric hue-angles each shifted by −30°).

It should be noted that it is preferable to execute a shift in chroma by multiplying each metric chroma value by a specific factor Kc as is done above, rather than by adding a specific amount to each metric chroma value. This is due to the fact that an achromatic (i.e. gray scale) color has a metric chroma value of 0. Thus, addition of some amount to that would result in achromatic colors being incorrectly reproduced as chromatic color values in the output color image.

Figure 12:
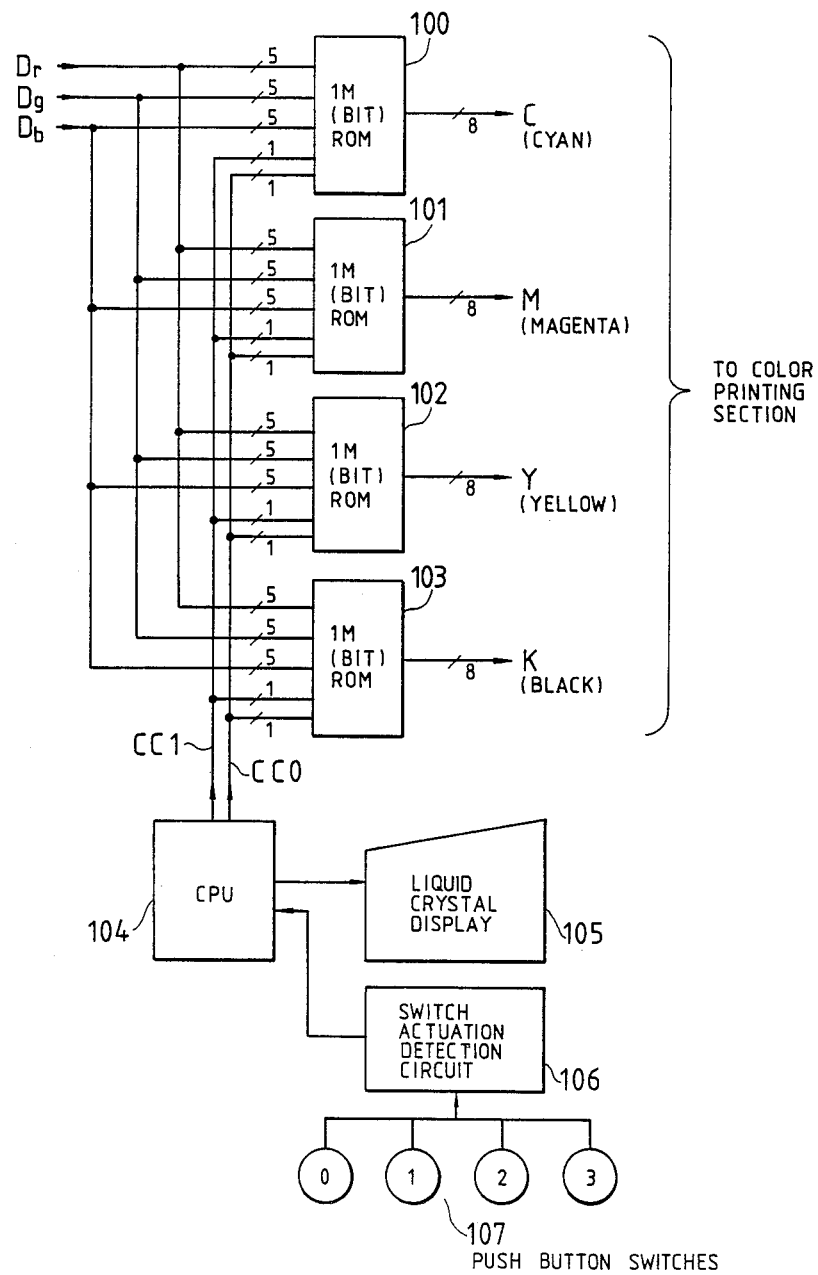
FIG. 12 is a block diagram of a practical arrangement for implementing the method of FIG. 11, whereby a plurality of tables for implementing color correction and different types of color adjustment can be selected.
Figure 13:
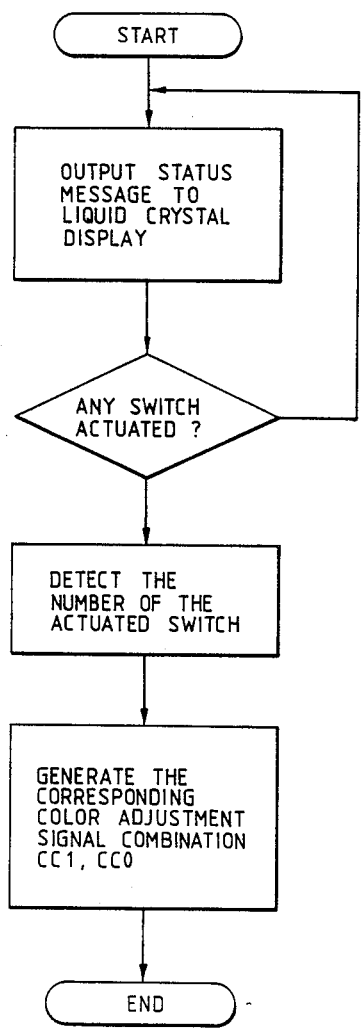
FIG. 13 is a flow chart of the operation of a CPU in the system of FIG. 12.

FIG. 12 is a block diagram showing an example of a configuration of a color correction table memory having four different correction/adjustment tables as described above stored therein, and means for selecting the respective tables. C, Y, M and K (i.e. black) output values of each of these tables are stored in respective 1 megabit ROM units 100, 101, 102 and 103. Each of these ROMs is addressed by input Dr, Dg, Db color density values produced by logarithmic conversion of tri-color (R,G,B) reflectance values supplied from the color scanning section, as described hereinabove referring to FIG. 7. The Dr, Dg and Db components of each of these input color density values are expressed as respective 5-bit data values. Selection of one of the four color correction/adjustment tables contained in the table memory is executed by a combination of two one-bit selection signals CC1 and CC0 which are produced from a CPU (central processing unit) 104 in accordance with actuation of one of a set of pushbutton switches 107, i.e. in response to a corresponding detection signal produced from a switch actuation detection circuit 106 and supplied to the CPU 104. The switches are numbered from 0 to 3, and actuation of each switch results in the correspondingly numbered one of the color correction/adjustment tables 0 to 3 being selected (and hence a corresponding reproduction modes 0 to 3 described above being established). Messages from the CPU 104, e.g. indicating the table that is currently established, are displayed by a liquid crystal display panel 105. The operation of CPU 104 is in accordance with the flow diagram of FIG. 13.

The relationships between actuations of switches 107, the selector signals CC1 and CC0, and the selected correction/adjustment tables are as shown in Table 5 below.

TABLE 5

| Adjustment executed | Pushbutton switch No. | CC1 logic level | CC0 logic level | Correction/ adjustment table No. |
|---|---|---|---|---|
| No adjustment | 0 | 0 | 0 | 0 |
| Chroma increase | 1 | 0 | 1 | 1 |
| Hue (+) adjustment | 2 | 1 | 0 | 2 |
| Hue (−) adjustment | 3 | 1 | 1 | 3 |

It should be noted that the method of the present invention is not limited to color adjustment utilizing correction table values that have been converted/reconverted to/from the L*u*v* color space, and adjusted by specific amounts within that color space. For example it would be equally possible to utilize some other standard color space, such as the L*a*b* space, in which hue, chroma and lightness attributes of a color are expressed as mutually separate quantities.

Furthermore it is not inherently essential that a color adjustment function be implemented by utilizing a plurality of color correction/adjustment tables having respectively differently color-adjusted sets of C,M,Y printing data values. For example, if a sufficiently high computation speed were available, it would be equally possible to use a single color correction table, and to execute the conversion/reconversion sequence of blocks 80 to 90 of FIG. 11 (with color corrected C,M, Y values successively outputted from the table memory during actual scanning of an original color image being converted/reconverted, rather than Dr, Dg, Db input values from the color scanner section) to obtain color corrected and color adjusted C, M, Y values by real-time operation, during normal scanning/printing by the color copier. In this case, continuously variable control of any or each of the lightness, chroma and hue attributes could be executed.

It can thus be understood from the above description that a color correction method according to the present invention enables accurate color correction to be applied to a color copier apparatus in a very simple manner, with the correction accuracy being independent of varying degrees of non-linearity of the printer or color analyzer characteristics of the color copier. The invention moreover enables adjustment of the lightness, hue and chroma attributes of colors reproduced by the color copier to easily be mutually independently adjusted in relation to the the color attributes of an original color image, with identical amounts of adjustment being applied to all colors that are reproduced.

What is claimed is:

1. In a method for developing a color correction table for color correction for a color copier apparatus including color scanning means for scanning an original color image to obtain successive input color values each expressed in a tri-color space, a color correction table memory responsive to respective ones of said input color values for producing corrected data comprising corresponding output color values, and color printing means responsive to said output color values for reproducing said original color image as an input color image, the improvement whereby said color correction table memory is produced by steps of:

(a) computing a set of color patch printing color values for use in printing respective ones of a set of color patches of respectively different sample colors;

(b) supplying said color patch printing color values to said color printing means for producing a printed set of color patches;

(c) scanning said printed set of color patches by said color scanning means for obtaining a set of color patch input data values, and temporarily storing said color patch input data values;

(d) generating a set of matrix input data values which form a regular 3-dimensional matrix array of color vanes when expressed in said tri-color color space, said set of matrix input data values comprising all of said input color values that can be produced by said color scanning means;

(e) for each of said matrix input data values, executing a computation to find one of said color patch input data values that is closest to said each matrix input data value within said tri-color space, and linking said each matrix input data value to one of said color patch printing color values which corresponds to said closest color patch input data value, to establishing said each matrix input data value and said corresponding color patch printing color value as input and output values respectively of an initial color correction table;

(f) executing 3-dimensional smoothing processing of all output values of said initial color correction table to obtain a final color correction table; and (g) storing said final color correction table in memory means as said color correction table memory.

2. In a method for developing a color correction table for color correction for a color copier apparatus including color scanning means for scanning an original color image to obtain successive input color values, a color correction table memory responsive to respective ones of said input color values for producing corrected data comprising corresponding output color values, and color printing means responsive to said output color values for reproducing said original color image as an output color image, the improvement whereby said color correction table memory is produced by steps of:

(a) computing a set of tri-color printing color values for use in printing respective ones of a set of color patches of respectively different sample colors;

(b) deriving from each of said tri-color printing color values a corresponding black color value based upon a fixed proportion of the tri-color components of said each printing color value, to thereby obtain a corresponding set of color patch printing 4-color color values each comprising three chromatic data values and one black data value;

(c) supplying said color patch printing 4-color density printing values to said color printing means for producing a printed set of color patches;

(d) scanning said printed set of color patches by said color scanning means to obtain a set of color patch input data values, and temporarily storing said color patch input data values;

(e) generating a set of matrix input data values which form a regular 3-dimensional matrix array of color values when expressed in a predetermined color space, said set of matrix input data values comprising all of said input color values that can be produced by said color scanning means;

(f) for each of said matrix input data values, executing a computation to find one of said color patch input data values that is closest to said each matrix input data value within said color space, and linking said each matrix input data value to one of said tri-color printing color values which corresponds to said closest color patch input data value, to establish said each matrix input data value and said corresponding tri-color printing color value as input and output values respectively of an initial color correction table;

(g) executing 3-dimensional smoothing processing of all output values of said initial color correction table to obtain an intermediate color correction table;

(h) deriving from each of said output values of said intermediate color correction table a black component value based upon a fixed proportion to tri-color components of said each output value, to thereby convert said output values to a corresponding set of color patch printing 4-color density values each comprising three chromatic data values and one black data value, and so obtain a final color correction table;

(i) storing said final color correction table in memory means to as said color correction table memory.

3. In a method for developing a color correction table for color correction for a color copier apparatus according to claim 2, in which said proportion used to obtain said black color value in said step (h) is smaller than said proportion used to obtain said black color value in said step (b).

4. In a method for developing a color correction table for color correction for a color copier apparatus according to claim 1 or 2, in which said step of generating a set of matrix input data values further comprises steps of:

(a) converting each of said matrix input data values to a corresponding color value expressed in a color space whereby metric lightness, metric chroma and metric hue attributes of a color are determined as respectively separate values;

(b) for at least one of said attributes to said each color value, executing color adjustment of said color value by multiplying said at least one attribute by a predetermined factor or by adding to said attribute a predetermined value; and (c) reconverting said each color value to a value expressed in said tri-color color space.

5. In a method for developing a color correction table for color correction for a color copier apparatus including color scanning means for scanning an original color image to obtain successive input color values expressed in a tri-color color space, a color correction table memory responsive to respective ones of said input color values for generating corrected data comprising Corresponding output color values, and color printing means responsive to said output color values for reproducing said original color image as an output color image, the improvement the improvement whereby said color correction table memory further generates said color values as color-adjusted values each having a at least one color attribute adjusted by a fixed amount, and whereby said color correction table memory is produced by steps of:

(a) computing a set of color patch printing color values for use in printing respective ones of a set of color patches of respectively different sample colors;

(b) supplying said color patch printing color values to said color printing means for producing a printed set of color patches;

(c) scanning said printed set of color patches by said color scanning means to obtain a set of color patch input data values, and temporarily storing said color patch input data values;

(d) generating a set of matrix input data values which form a regular 3-dimensional matrix array of color values when expressed in said tri-color color space, said set of matrix input data values comprising all of said input color values that can be produced by said color scanning means;

(e) converting each of said matrix input data values to a corresponding color value expressed in a color space whereby metric lightness, metric chroma and metric hue attributes of a color are determined as respectively separate values;

(f) for at least one of said attributes of said each color value, executing color adjustment of said color value by multiplying said at least one attribute by a predetermined factor or by adding to said attribute a predetermined value;

(g) reconverting said each color value to a value expressed in said tri-color space, to thereby obtain a set of color-adjusted matrix input data values;

(h) for each of said color-adjusted matrix input data values, executing a computation to find one of said color patch input data values that is closest to said each color-adjusted matrix input data value within said tri-color color space, and linking said color-adjusted matrix input data value to one of said color patch printing color values which corresponds to said closest color patch input data value, to establish said each color-adjusted matrix input data value and said corresponding color patch printing color value as input and output values respectively of an initial color correction table;

(i) executing 3-dimensional smoothing processing of all output values of said initial color correction table to obtain a final color correction table; and (j) storing said final color correction table in memory means as said color correction table memory.

6. In a method for developing a color correction table for color correction for a color copier apparatus including color scanning means for scanning an original color image to obtain successive input color values, a color correction table memory responsive to respective ones of said input color values for generating corrected data comprising corresponding output color values, and color printing means responsive to said output color values for reproducing said original color image as an output color image, the improvement whereby said color correction table memory further generates said color values as color-adjusted values each having a least one color attribute adjusted by a fixed amount, and whereby said color correction table memory is produced by steps of:

(a) computing a set of tri-color printing color values for use in printing respective ones of a set of color patches of respectively different sample colors;

(b) deriving from each of said tri-color printing color values a corresponding black color value based upon a fixed proportion of the tri-color components of said each printing color value, to thereby obtain a corresponding set of color patch printing 4-color color values each comprising three chromatic data values and one black data value;

(c) supplying said color patch printing 4-color density printing values to said color printing means for producing a printed set of color patches;

(d) scanning said printed set of color patches by said color scanning means to obtain a set of color patch input data values, and temporarily storing said color patch input data values;

(e) generating a set of matrix input data values which form a regular 3-dimensional matrix array of color values when expressed in a predetermined color space, said st of matrix input data values comprising all of said input color values that can be produced by said color scanning means;

(f) converting each of said matrix input data values to a corresponding color value expressed in a color space whereby metric lightness, metric chroma and metric hue attributes of a color are determined as respectively separate values;

(g) for at least one of said attributes of said each color value, executing color adjustment of said color value by multiplying said at least one attribute by a predetermined factor or by adding to said attribute a predetermined value;

(h) reconverting said each color value to a value expressed in said tri-color color space, to thereby obtain a set of color-adjusted matrix input values;

(i) for each of said color-adjusted matrix input data values, executing a computation to find one of said color patch input data values that is closest to said color-adjusted matrix input data value within said color space, and linking said color-adjusted matrix input data value to one of said tri-color printing color values which corresponds to said closest color patch input data value, to establish said color-adjusted matrix input data value and said corresponding tri-color printing color value as input and output values respectively of an initial color correction table;

(j) executing 3-dimensional smoothing processing of all output values of said initial color correction table to obtain an intermediate color correction table;

(k) deriving from each of said output values of said intermediate color correction table a black component value based upon a fixed proportion of tri-color components of said each output value, to thereby convert said output values to a corresponding set of color patch printing 4-color density values. each comprising three chromatic data values and one black data value, and so obtain a final color correction table; and (l) storing said final color correction table in memory means to as said color correction table memory.

* * * * *